United States Patent
Huang et al.

(10) Patent No.: US 10,193,942 B2
(45) Date of Patent: Jan. 29, 2019

(54) MOBILE MEDIA ARCHITECTURE FOR SPONSORED DATA SERVICES

(71) Applicant: Verizon Patent and Licensing Inc., Arlington, VA (US)

(72) Inventors: Jian Huang, Sudbury, MA (US); Susan Kelly, Maynard, MA (US); Gong Zhang, Waltham, MA (US); Fnu Bongu Huma Shankar Rao, Waltham, MA (US); Jae Won Chung, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 159 days.

(21) Appl. No.: 14/922,920

(22) Filed: Oct. 26, 2015

(65) Prior Publication Data
US 2017/0118264 A1    Apr. 27, 2017

(51) Int. Cl.
*H04L 29/06*  (2006.01)
*H04L 29/08*  (2006.01)
*G06Q 30/02*  (2012.01)

(52) U.S. Cl.
CPC ..... *H04L 65/4084* (2013.01); *G06Q 30/0267* (2013.01); *H04L 67/02* (2013.01); *H04L 67/20* (2013.01)

(58) Field of Classification Search
None
See application file for complete search history.

(56) References Cited

U.S. PATENT DOCUMENTS

| | | | | |
|---|---|---|---|---|
| 2002/0176377 | A1* | 11/2002 | Hamilton | H04L 12/66 370/328 |
| 2005/0050172 | A1* | 3/2005 | Redpath | G06F 17/30899 709/219 |
| 2008/0214148 | A1* | 9/2008 | Ramer | G06F 17/30749 455/414.1 |
| 2012/0084184 | A1* | 4/2012 | Raleigh | H04M 15/7652 705/30 |
| 2012/0155380 | A1* | 6/2012 | Hodges | G06Q 30/00 370/328 |
| 2013/0005350 | A1* | 1/2013 | Campos | H04W 48/18 455/456.1 |
| 2014/0036785 | A1* | 2/2014 | Li | H04L 12/1407 370/328 |
| 2014/0348029 | A1* | 11/2014 | Lee | H04L 12/1453 370/259 |
| 2015/0242903 | A1* | 8/2015 | Peebles | G06Q 30/0267 705/14.64 |
| 2015/0379579 | A1* | 12/2015 | Chiang | G06Q 30/0267 705/14.64 |

* cited by examiner

Primary Examiner — Thomas J Dailey (57) ABSTRACT

Methods and devices provide access to a sponsored data service (SDS) from a mobile device. A method may include generating a play media command that includes a remote media address and an SDS identifier, and converting the remote media address into a local media address. The method may further include requesting media from an internal content server via the local media address, where the internal content server resides within the mobile device. The method may include determining if the requested media is stored on the internal content server, obtaining the requested media from the internal content server upon determining that the requested media is stored within the internal content server, and playing the requested media on a mobile media player.

20 Claims, 8 Drawing Sheets

MOBILE MEDIA ARCHITECTURE FOR SPONSORED DATA SERVICES

BACKGROUND

Access to wireless communication networks and data services typically involves some form of payment by the user of a mobile device. Some forms of access include a service plan that involves a contractual arrangement having a limited amount of data usage over a set period of time (e.g., such limits may be enforced by "data caps"). In some instances, a third party may wish to sponsor a user's data consumption for particular types of promotions in order to entice user engagement. Because the sponsored data does not count against a service plan's data caps, a user is more likely to participate in promotions supported by sponsored data services.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to approaches for providing a mobile media architecture for sponsored data services. A sponsored data service (SDS) may be a network service that is financially supported by a third party entity. The third party entity, hereinafter referred to as a "sponsor," subsidizes the network data exchanged between a mobile device and a specified content provider. The sponsor may have a relationship with the network provider that permits the automatic billing of the sponsor for the exchanged data, instead of the user of the mobile device. Thus, the data exchanged through the SDS (which may also be referred to herein as "sponsored data") is effectively "toll-free" as seen by the user of the mobile device. The sponsored data may be downloaded to the mobile device from the specified content provider, and/or uploaded from the mobile device to the specified content provider.

In order to access the specified content provider and ensure that the sponsor is billed for the sponsored data exchange, a specific SDS media address may be used as a network address for a content network device. In an embodiment, the hyper-text transfer protocol (HTTP) may be used to exchange the data, so the SDS media address may take the form of a sponsored data service universal resource locator (URL) (hereinafter referred to as an "SDS_URL" or a "toll free URL"). However, conventional mobile media players, either native media players associated with the operating system of the mobile device, and/or third party media players created by third party developers, may have to be modified in order to use the SDS media address. Because the modification of conventional mobile media players may be difficult, embodiments provided herein provide architectures which permit the use of SDS media addresses without having to modify conventional mobile media players.

Figure 1:
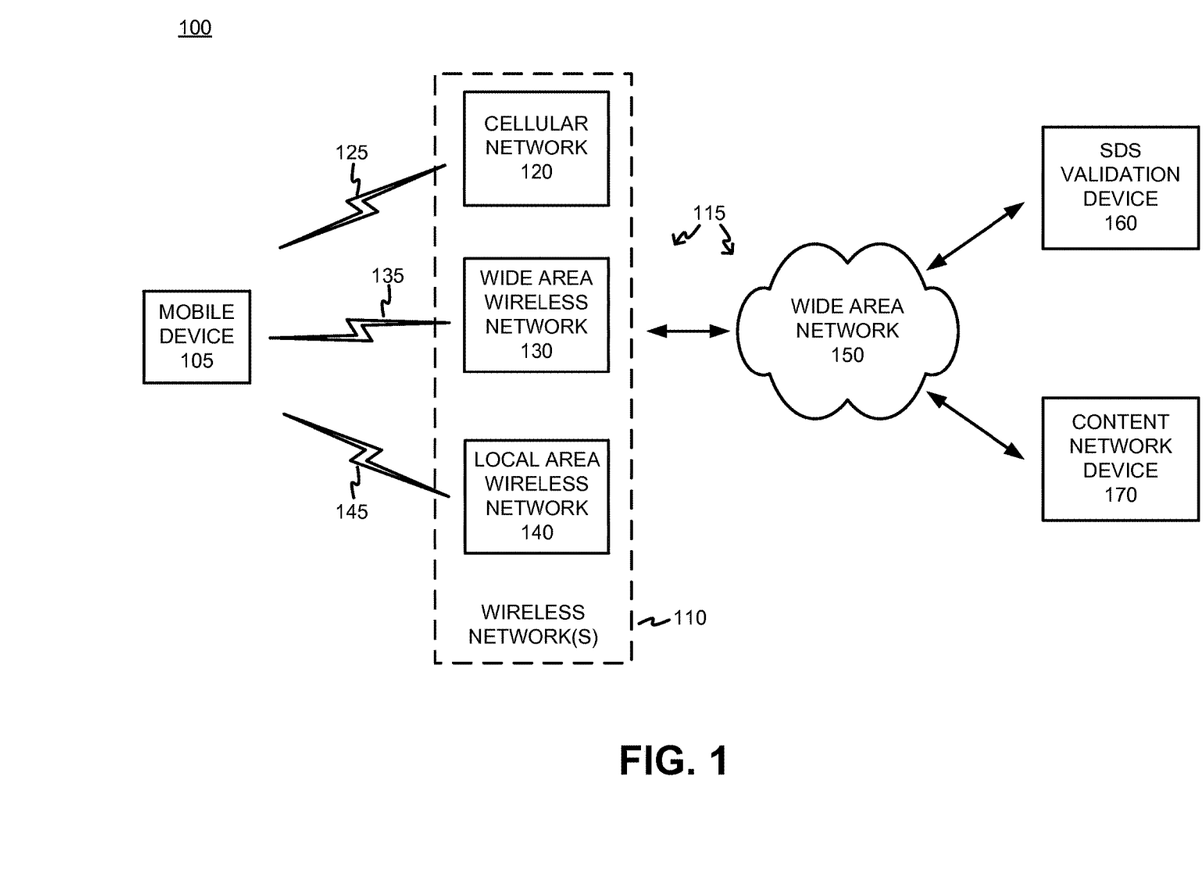
FIG. 1 is a block diagram of an exemplary network environment for providing sponsored data services.

FIG. 1 is a block diagram of an exemplary environment 100 for providing sponsored data services (SDSs). Environment 100 may include one or more mobile device 105, network 115, an SDS validation device 160, and a content network device 170. Network 115 may include one or more wireless network(s) 110 and a wide area network 150. Wireless networks 110 may further include, for example, a cellular network 120, a wide area wireless network 130, and/or a local area wireless network 140. For ease of explanation, only one mobile device 105, SDS validation device 160, and content network device 170 are illustrated as being connected to network 115. However, it should be understood that a plurality of mobile devices 105, SDS validation devices 160, content network devices 170, and/or other known network entities may be communicatively coupled to network 115. FIG. 1 depicts a representative environment 100 with exemplary components and configuration shown for purposes of explanation. Other embodiments may include additional or different network entities in alternative configurations than which are exemplified in FIG. 1.

Mobile device 105 may obtain access to network 115 through wireless network(s) 110 over any type of known radio channel or combinations thereof. For example, mobile device 105 may access any cellular network 120 over wireless channel 125. Access over wireless channel 125 may be provided through a base station, eNodeB, etc., within cellular network 120, as will be described in more detail below in reference to an embodiment shown in FIG. 2. In various embodiments, cellular network 120, wide area wireless network 130, and/or local area wireless network 140 may also communicate with each other in addition to mobile device 105. Mobile device 105 may also access network 115 over wireless channel 135 through wide area wireless network 130. Wide area wireless network 130 may include any type wireless network covering larger areas, and may include a mesh network (e.g., IEEE 801.11s) and/or or a WiMAX IEEE 802.16. Mobile device 105 may access network 115 over wireless channel 145 through local area wireless network 140, which may include WiFi (e.g., any IEEE 801.11x network, where x=a, b, g, n, and/or ac). The wireless network(s) 110 may exchange data with wide area network 150 that may include backhaul networks, backbone networks, and/or core networks. SDS validation device 160 and/or content network device 170 may interface with wide area network 150, and thus with mobile device 105 over one or more of the air interfaces 125, 135, 145 through wireless network(s) 110.

Mobile device 105 may obtain SDS access to network 115 over one or more air interfaces 125, 135, and/or 145, which may supported by the sponsor to provide content to mobile device 105 through content network device 170. As used herein, content may also be referred to herein as "media," and may include any type of digital data representing user-interpretable information, including text, image, audio, and/or video data. Media may also include one or more combinations of any type of digital data that may be arranged, composited, and presented to the user, such as, for example, in the form of webpages described using hypertext markup language (HTML). Connections for sponsored data exchanges may be established by sponsors who may arrange access for particular events and/or promotions (which may be referred to herein as "campaigns"). The campaigns may be arranged through a portal network device assigned by the network provider (e.g., a web portal under control of the network provider). In one embodiment, the portal network device used to arrange campaigns may be SDS validation device 160.

When arranging a campaign, the sponsor may set various parameters for the campaign (such as, for example, media specification, time duration, maximum number of users, maximum allotment of data, etc.), provide an SDS media addresses for accessing sponsored data, and/or provide mappings of SDS media address to a remote media address. The remote media address can identify the network locations for one or more content network device(s) 170, which may act as repositories and/or distribution devices for media. In an embodiment, the SDS provides that sponsored data be identified by the remote media address (e.g., a content URL designated by the sponsor) in the portal network device.

In an embodiment, the portal network device may generate the SDS media address (e.g., a toll free URL) from the supplied remote media address provided by the sponsor during the creation of the campaign. The generated SDS media addresses may contain special network destination information, security information (e.g., a signature, token, key, etc.), and/or additional parameters that are used by the network provider backend in, for example, the data accounting and/or billing processes.

With mobile device 105, mobile applications and/or webpages downloaded through a mobile browser may use one or more software development kits that support the SDS. Such mobile applications and/or websites may download sponsored content by making network requests using the appropriate SDS media addresses. The SDS requests may be intercepted by the network provider's existing service platform backend infrastructure, which may track downloaded SDS data and bill the sponsor for the cost of the data used by the campaign.

The following is an example of how the SDS may be used in a movie promotion/campaign. Mobile applications, such as, for example, Fandango, may be used to investigate movies playing at local movie theaters, the ratings of the movies, and/or the specific times when the movies are being shown. Once a movie is selected, a ticket may be purchased through the mobile application. A sponsor, such as, for example, the developer of the mobile application, may sponsor data used by the mobile application for downloading movie previews, reviews, and/or show times. Through the use of sponsored data, the user may be more willing to use the mobile application without having to worry about hitting the data caps associated with the user's wireless service plan. By shifting the cost of data away from the user using the SDS, the mobile application will receive more use, and thus increase number of movie promotions viewed, and drive the sales of movie tickets.

Embodiments herein provide an SDS where the logic for handling the SDS media addresses may be encapsulated within the architecture, and thus be essentially transparent to developers of mobile applications, and not require time consuming software modifications of mobile media players. The developer of the mobile application only needs to provide the SDS media address, which may be facilitated by use of an application programming interface (API) as explained in more detail below in relation to FIG. 4. Accordingly, the mobile application developer may utilize the existing mobile media player, which may be native to the operating system of the mobile, or be a third party media player that may have been downloaded from an "app store" by the user. Embodiments providing the SDS may also be independent with other functionalities and/or protocols associated with the transferring of media, such as, for example digital rights management (DRM) techniques. Moreover, the SDS approaches described herein do not have any significant performance impact on media transfer and playback. For example, one component, an internal content server, which may buffer and serve content on-board mobile device 105 (as described in more detail in relation to FIG. 4), may be lightweight as it may utilize basic HTTP protocols. Various caching and storage strategies may be applied to cache SDS media address validation data and/or media data. Moreover, various components in the embodiments supporting the SDS may be loosely coupled, thus new SDS service features and/or changes may be easily applied without changing the data flows of the mobile application and/or the mobile media player.

Further referring to FIG. 1, mobile device 105 may include any type of electronic device having communication capabilities, and thus communicate over network 115 using a variety of different channels, including both wired and wireless connections. Mobile device 105 may include, for example, a cellular radiotelephone, a smart phone, a wearable computer (e.g., a wrist watch, eye glasses, etc.), a tablet, a set-top box (STB), a mobile phone, any type of IP communications device, a Voice over Internet Protocol (VoIP) device, a laptop computer, a palmtop computer, a gaming device, a media player device, or a digital camera that includes communication capabilities (e.g., wireless communication mechanisms).

Wireless network(s) 110 may include one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Wide area network 150 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

SDS validation device 160 may be any type of network device, such as, for example, a server, computer, etc., that receives information associated with an SDS request from mobile device 105. SDS validation device 160 may determine whether a particular SDS media address is associated with a valid campaign, verify identity and/or credentials of the sponsor, validate the identity of a user associated with the request, etc. Upon determining the campaign and/or sponsor associated with the sponsored data request are valid, SDS validation device 160 may approve the sponsored data request.

Content network device 170 may be any type of network device (e.g., a web server, computer, media repository, streaming source, etc.) that may respond to requests to provide any type of content or media. Content network device 170 may store and provide any type of media, such as, for example, text, audio, image, video, software code, etc. Alternatively, content network device 170 may be, or provide a connection to, another communications provider (e.g., other wireless carrier, over the top (OTT) service, etc.), and thus provide mobile device 105 with voice, text, and/or video communications from other sources outside the control of the network service provider.

Figure 2:
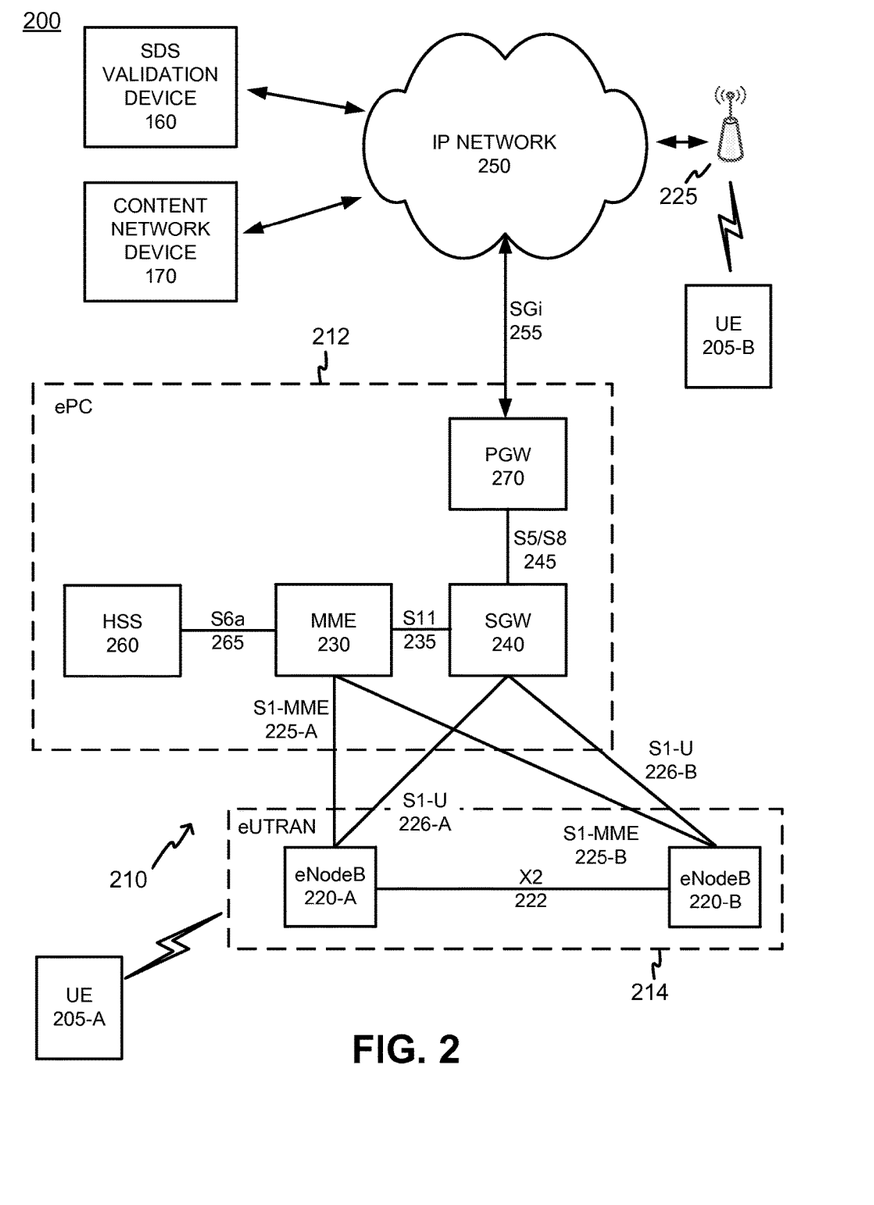
FIG. 2 is a block diagram of an exemplary wireless network which supports sponsored data services.

FIG. 2 is a block diagram of an exemplary networking system 200 that provides a SDS over various types of wireless channels. As shown in FIG. 2, networking system 200 may include mobile device 105 embodied as user equipment (UE) 205-A and UE 205-B (as used herein, collectively referred to as "UE 205" and individually as "UE 205-*x*"), a wireless network 210 which includes an evolved Packet Core (ePC) 212 and an evolved UMTS Terrestrial Network (eUTRAN) 214, an Internet Protocol (IP) network 250, a WiFi wireless access point (WAP) 225, SDS validation device 160, and content network device 170.

Wireless network 210 may be a long term evolution (LTE) network, and include one or more devices that are physical and/or logical entities interconnected via standardized interfaces. Wireless network 210 provides wireless packet-switched services and wireless IP connectivity to user devices to provide, for example, data, voice, and/or multimedia services. The ePC 212 may further include a mobility management entity (MME) 230, a serving gateway (SGW) device 240, a packet data network gateway (PGW) 270, and a home subscriber server (HSS) 260. The eUTRAN 214 may further include one or more eNodeBs 220-A and 220-B (herein referred to collectively as "eNodeB 220" and individually as "eNodeB 220-*x*"). It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, each eNodeB 220 may include one or more devices and other components having functionality that allow UE 205 to wirelessly connect to eUTRAN 214. eNodeB 220 may interface with ePC 212 via a S1 interface, which may be split into a control plane S1-MME interface 225-A and a data plane S1-U interface 226-B. S1-MME interface 225-A may interface with MME device 230. S1-MME interface 225-A may be implemented, for example, with a protocol stack that includes a Network Access Server (NAS) protocol and/or Stream Control Transmission Protocol (SCTP). S1-U interface 226-B may interface with SGW 240 and may be implemented, for example, using a General Packet Radio Service Tunneling Protocol version 2 (GTPv2). eNodeB 220-A may communicate with eNodeB 220-B via an X2 interface 222. X2 interface 222 may be implemented, for example, with a protocol stack that includes an X2 application protocol and SCTP.

MME device 230 may implement control plane processing for ePC 212. For example, MME device 230 may implement tracking and paging procedures for UE 205, may activate and deactivate bearers for UE 205, may authenticate a user of UE 205, and may interface to non-LTE radio access networks. A bearer may represent a logical channel with particular quality of service (QoS) requirements. MME device 230 may also select a particular SGW 240 for a particular UE 205. A particular MME device 230 may interface with other MME devices 230 in ePC 212 and may send and receive information associated with UEs, which may allow one MME device to take over control plane processing of UEs serviced by another MME device, if the other MME device becomes unavailable.

SGW 240 may provide an access point to and from UE 205, may handle forwarding of data packets for UE 205, and may act as a local anchor point during handover procedures between eNodeBs 220. SGW 240 may interface with PGW 270 through an S5/S8 interface 245. S5/S8 interface 245 may be implemented, for example, using GTPv2.

PGW 270 may function as a gateway to IP network 250 through a SGi interface 255. IP network 250 may include, for example, an IP Multimedia Subsystem (IMS) network, which may provide voice and multimedia services to UE 205, based on Session Initiation Protocol (SIP). A particular UE 205, while connected to a single SGW 240, may be connected to multiple PGWs 270, one for each packet network with which UE 205 communicates.

Alternatively UE 205 may exchange data with IP network 250 though WiFi wireless access point (WAP) 225. The WiFi WAP 225 may be part of a local area network, and access IP network 250 through a wired connection via a router. Alternatively, WiFi WAP 225 may be part of a mesh network (e.g., IEEE 801.11s). WiFi WAP 225 may be part of a local area network, or part of a wide area network (WiMaxx) or a mesh network (IEEE 801.11s).

MME device 230 may communicate with SGW 240 through an S11 interface 235. S11 interface 235 may be implemented, for example, using GTPv2. S11 interface 235 may be used to create and manage a new session for a particular UE 205. S11 interface 235 may be activated when MME device 230 needs to communicate with SGW 240, such as when the particular UE 205 attaches to ePC 212, when bearers need to be added or modified for an existing session for the particular UE 205, when a connection to a new PGW 270 needs to created, or during a handover procedure (e.g., when the particular UE 205 needs to switch to a different SGW 240).

HSS device 260 may store information associated with UEs 205 and/or information associated with users of UEs 205. For example, HSS device 260 may store user profiles that include authentication and access authorization information. MME device 230 may communicate with HSS device 260 through an S6a interface 265. S6a interface 265 may be implemented, for example, using a Diameter protocol.

SDS validation device 160 may exchange information using a standard TCP/IP interface with IP network 250, and further communicate with ePC 212 using SGi 255. Communications between SDS validation device and UEs 205 may be performed through ePC 212 and eUTRAN 214 as shown for UE 205-A, or through WiFi WAP 225 as shown for UE 205-B. The communications between validation device 160 and UE 205 may be channel agnostic, and thus may be performed using any known wireless and/or wired channels, or combinations thereof. Accordingly, other methods for communication between SDS validation device 160 and UE 205 may be used which are not illustrated in FIG. 2.

Content network device 170 may be any type of web server, media repository, streaming source, etc., that can provide UE 205 with content which is requested by the user. A content network device 170 may provide any form of media, text, audio, image, video, etc., which can be requested by the user through UE 205. Moreover, content network device 170 may provide simultaneous broadcast of data to a plurality of UEs 205 using simulcast and/or multicast techniques, such as, for example, any type of multimedia broadcast multicast service (MBMS) and/or evolved MBMS (eMBMS) over LTE. In one embodiment, UE 205 may provide a request for SDS to content network device 170 over wireless network 210. The request for sponsored data access may be initially received by the eUTRAN 214, and then forwarded through gateways SGW 240 and PGW 270 to content network device 170.

While FIG. 2 shows exemplary components of system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
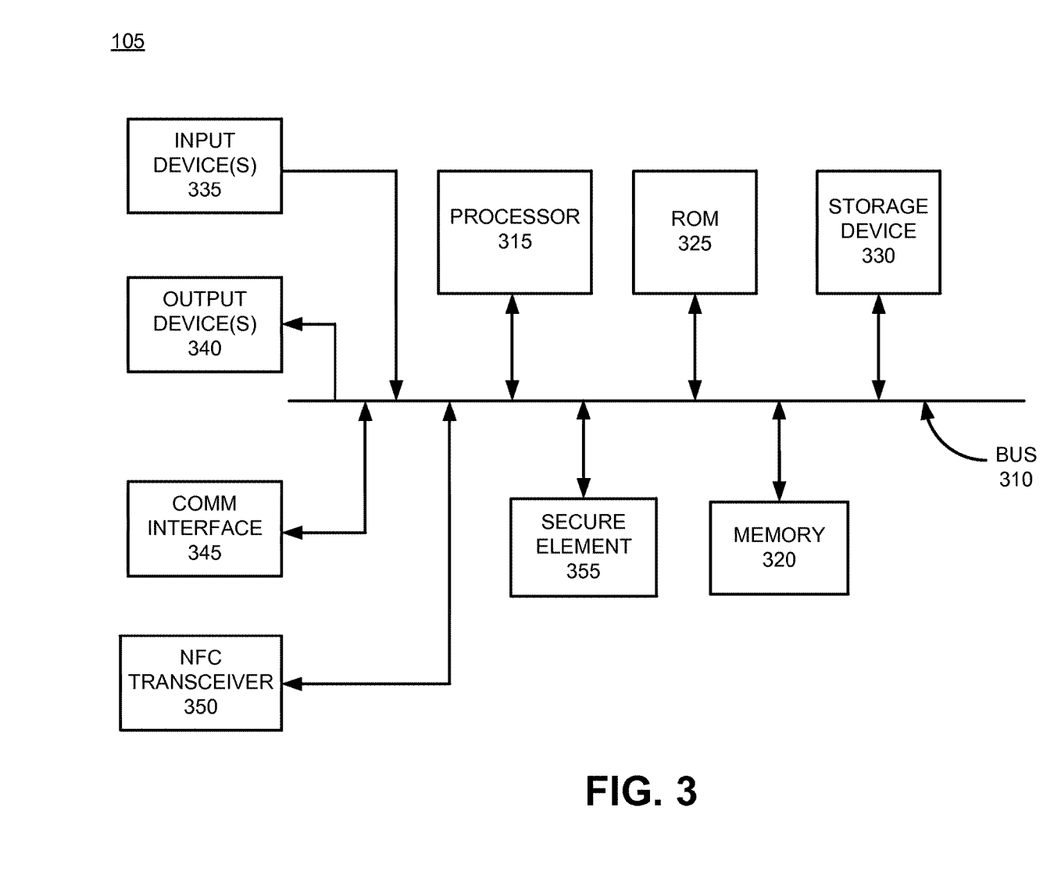
FIG. 3 is a block diagram showing exemplary components of a mobile device according to an embodiment.

FIG. 3 is a block diagram showing exemplary components of mobile device 105 according to an embodiment. Mobile device 105 may include a bus 310, a processor 315, memory 320, a read only memory (ROM) 325, a storage device 330, one or more input device(s) 335, one or more output device(s) 340, a communication interface 345, a Near Field Communications (NFC) transceiver 350, and Secure Element (SE) 355. Bus 310 may include a path that permits communication among the elements of mobile device 105.

Processor 315 may include a processor, microprocessor, or processing logic that may interpret and execute instructions. Memory 320 may include a random access memory (RAM) or another type of dynamic storage device that may store information and instructions for execution by processor 315. ROM 325 may include a ROM device or another type of static storage device that may store static information and instructions for use by processor 315. Storage device 330 may include a solid state, magnetic and/or optical recording medium.

Input device(s) 335 may include one or more mechanisms that permit an operator to input information to mobile device 105, such as, for example, a keypad or a keyboard, a microphone, voice recognition, components for a touch-screen, and/or biometric mechanisms, etc. Output device(s) 340 may include one or more mechanisms that output information to the operator, including a display, a speaker, etc. Communication interface 345 may include any transceiver mechanism that enables mobile device 105 to communicate with other devices and/or systems. For example, communication interface 345 may include mechanisms for communicating with another device or system via a network, such as wireless network(s) 110.

Secure Element (SE) 355 may be inserted into a secure element interface (I/F) (e.g., a smart card or Subscriber Identifier Module (SIM) card interface) of mobile device 105. SE 355 may store secure applications and data to permit mobile device 105 to perform trusted exchanges with other network entities. In alternative embodiments, SE 355 may be permanently coupled to mobile device 105, and thus cannot be removed by a user. SE 355 may include, for example, a Universal Integrated Circuit Card (UICC), a removable user identity card (R-UIM), a subscriber identity module (SIM), a universal subscriber identity module (USIM), or an Internet Protocol (IP) multimedia services identity module (ISIM).

In general, SE 355 provides a tamper-resistant platform (e.g., a single-chip secure microcontroller) capable of securely hosting applications and their associated confidential and/or cryptographic data (e.g., key management) in accordance with the rules and security requirements set forth by a set of well-identified trusted authorities. SE 355 may be capable of securely storing applications (hereinafter referred to as "secure applications") and cryptographic data (such as, for example, secure keys). The secure information stored in SE 355 may be managed in accordance with rules and security requirements provided by established trusted authorities. Accordingly, SE 355 provides the security and confidentiality required to perform validation of a user's identity for SDS access to networking system 200, and/or support trusted exchanges among various network entities over networking system 200.

Figure 6:
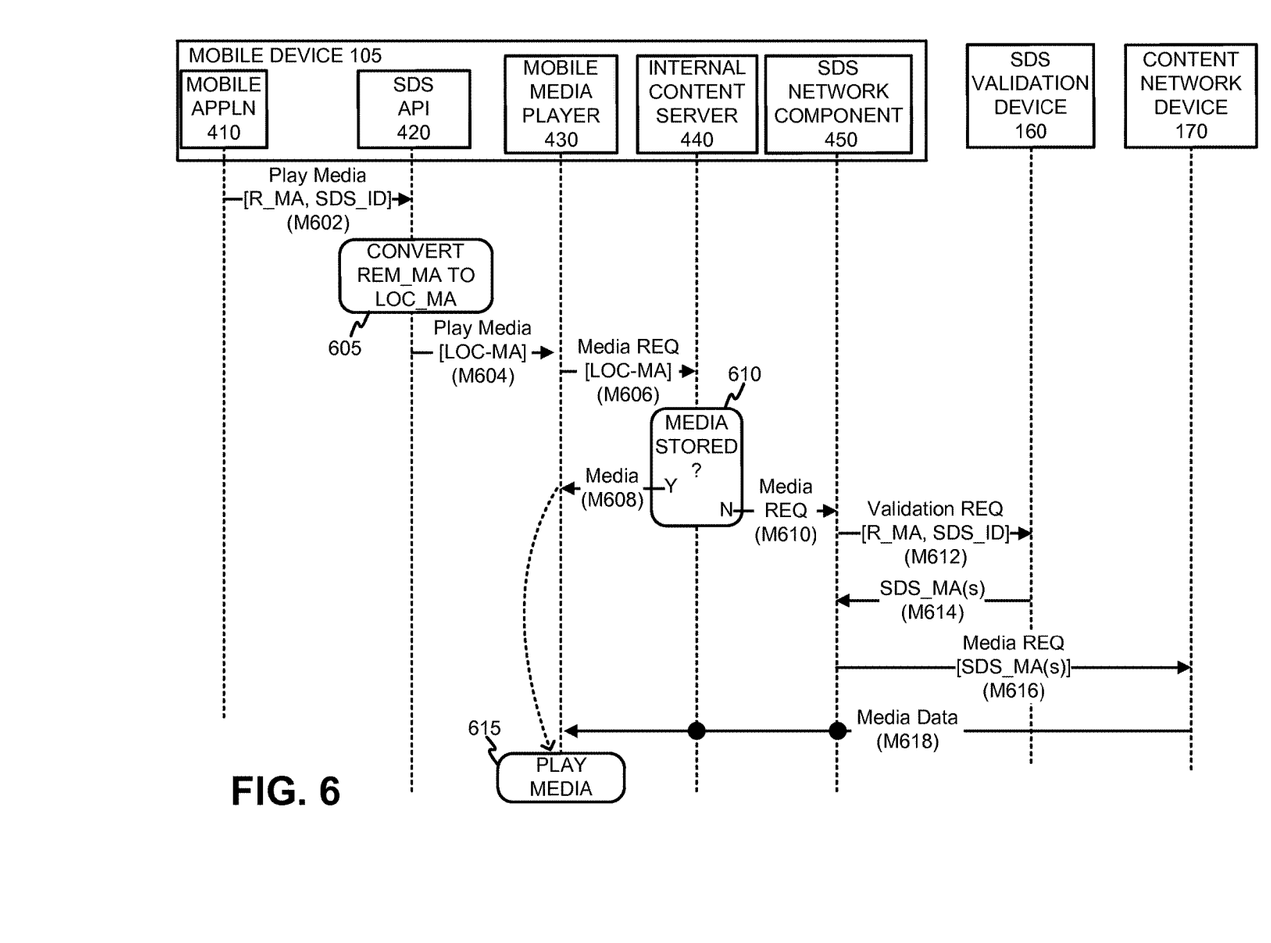
FIG. 6 is a diagram depicting exemplary message flows between selected devices within the network environment shown in FIG. 1.

Mobile device 105 may perform certain operations or processes, as may be described in detail below. Mobile device 105 may perform these operations in response to processor 315 executing software instructions contained in a computer-readable medium, such as memory 320 and/or storage device 330. A computer-readable medium may be defined as a physical or logical memory device. A logical memory device may include memory space within a single physical memory device or spread across multiple physical memory devices. The software instructions may be read into memory 320 from another computer-readable medium, such as storage device 330, or from another device via communication interface 345. The software instructions contained in memory 320 may cause processor 315 to perform operations or processes that will be described in detail with respect to FIG. 7, and exchange messages with other internal modules and/or external network devices as shown in FIG. 6. Alternatively, hardwired circuitry may be used in place of or in combination with software instructions to implement processes consistent with the principles of the embodiments. Thus, exemplary implementations are not limited to any specific combination of hardware circuitry and software.

The configuration of components of mobile device 105 illustrated in FIG. 3 is for illustrative purposes only. It should be understood that other configurations may be implemented. Therefore, mobile device 105 may include additional, fewer and/or different components than those depicted in FIG. 3.

Figure 4:
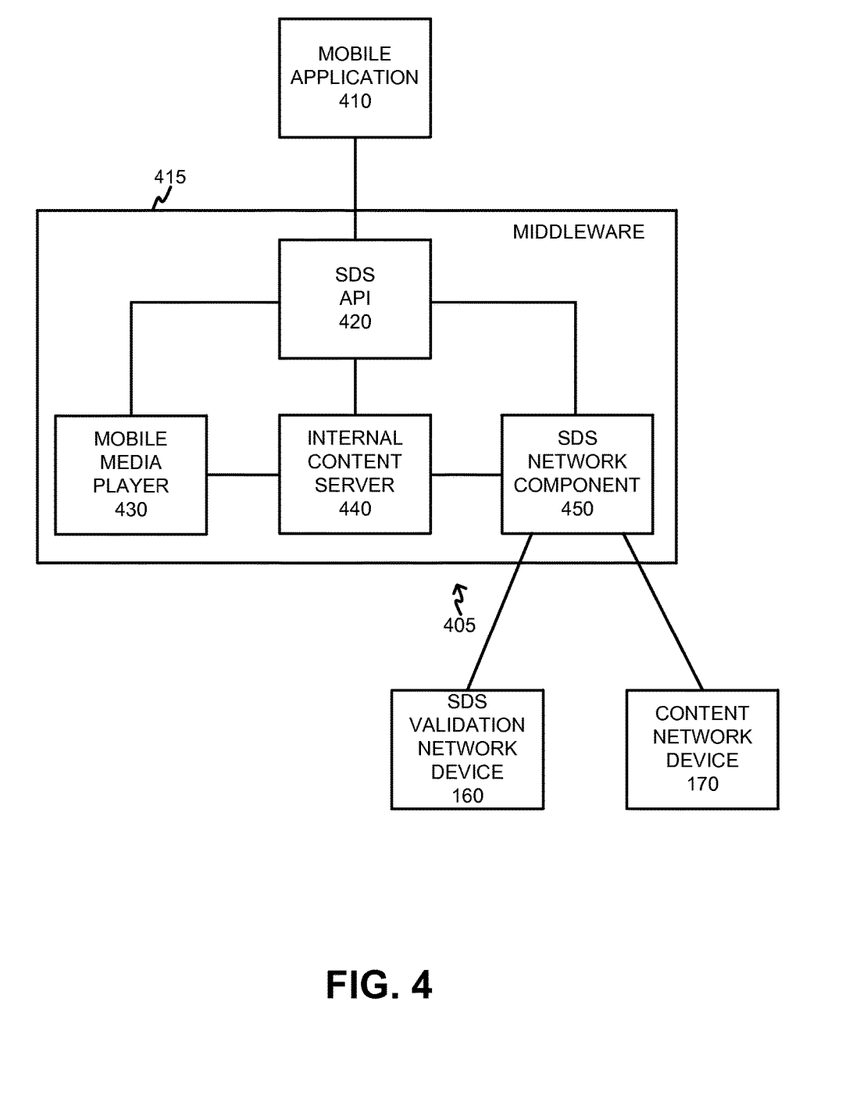
FIG. 4 is a diagram depicting exemplary modules on a mobile device for supporting sponsored data services.

FIG. 4 is a diagram depicting exemplary modules 405 associated with mobile device 105 that facilitate sponsored data services. Modules 405 may include mobile application 410 and middleware 415. Middleware may further include SDS application programming interface (API) 420, mobile media player 430, internal content server 440, and SDS network component 450. Modules 405 may be embodied in software, and thus stored within memory 320 and/or storage device 330. However, in other embodiments one more of modules 405 may be embodied in hardware, or in a combination of hardware and software.

Mobile application 410 may interface to middleware components 415 via SDS API 420. Mobile application 410 may provide a user interface so that the user of mobile device 105 can request various forms of media, and once the requested media is received, mobile application 410 may provide a formatted output so that the media may be shown to the user. The actual rendering and playing of the media may be performed by mobile media player 430, which may utilize standard codecs to decode received media content, which may be encoded for compression and/or error correction, and may be encrypted for digital rights management (DRM) protection.

Conventional requests for media made by mobile application 410 may include a remote media address which provides a network location of content network device 170 from which the requested media may be obtained. However, in order to have the requested media be provided through the SDS, and thus be "toll free" to the user, a different type of address, called an SDS media address, may be used in the media request so that the proper content network device may be addressed, and also so that network provider can bill the sponsor for the data instead of billing the requesting user for SDS provided media. In order to avoid altering the mobile media player so that it can directly utilize the SDS media addresses, the SDS architecture includes internal content server 440 that is within mobile device 105. SDS media requests from the mobile media player 430 are served by the internal content server 440 using a local media address, instead of going out over network 115 using the SDS media address. The internal content server 440, along with SDS API 420 and SDS network component 450, effectively intercepts SDS media requests made by mobile media player 430, thus obviating the requirement that mobile player 430 handle SDS media address, which would require modifying mobile media player 430 software.

When a media request is made by the mobile application 410 which may be supported by SDS, and thus paid for by the sponsor, the media request may first be intercepted by SDS API 420, which translates the remote media address to local media address for use with internal content server 440. If the requested content is available locally, it is provided to mobile media player 430. If the requested content is not available, SDS network component 450 requests an SDS media address from SDS validation device 160. If properly validated, SDS validation device 160 provides the SDS media address to SDS network component 450, which then uses the SDS media address to obtain the sponsored media from content network device 170. Once SDS network component 450 obtains the requested sponsored media, it passes the media to internal content server 440, which may subsequently be accessed by mobile media player 440 using a local media address.

Using the architecture of the modules shown in FIG. 4 permits a mobile applications developer to easily integrate SDS into the mobile application and retain all of the benefits (e.g., high decoding performance, DRM, etc.) without having to request modifications to native and/or third party mobile media players. The modifications to the mobile application are minimal, as the mobile applications developer need only change an API call, such as, for example, "playMedia." Specifically, if the developer previously made the API call based only on the remote medial call (e.g., playMedia(String rem_mediaURL)), utilization of the call using the SDS API 420 may only invoke a small change to add an SDS identifier (e.g., playMedia(String rem_mediaURL, String SDS_ID)), where the SDS_ID may include information identifying a sponsor's account identifier, and indicate where and/or to whom a fee may be charged to pay for the sponsored data. Details of the interaction between modules 405, SDS validation device 160, and content network device 170 are provided below in relation to the description of FIG. 6

Figure 5:
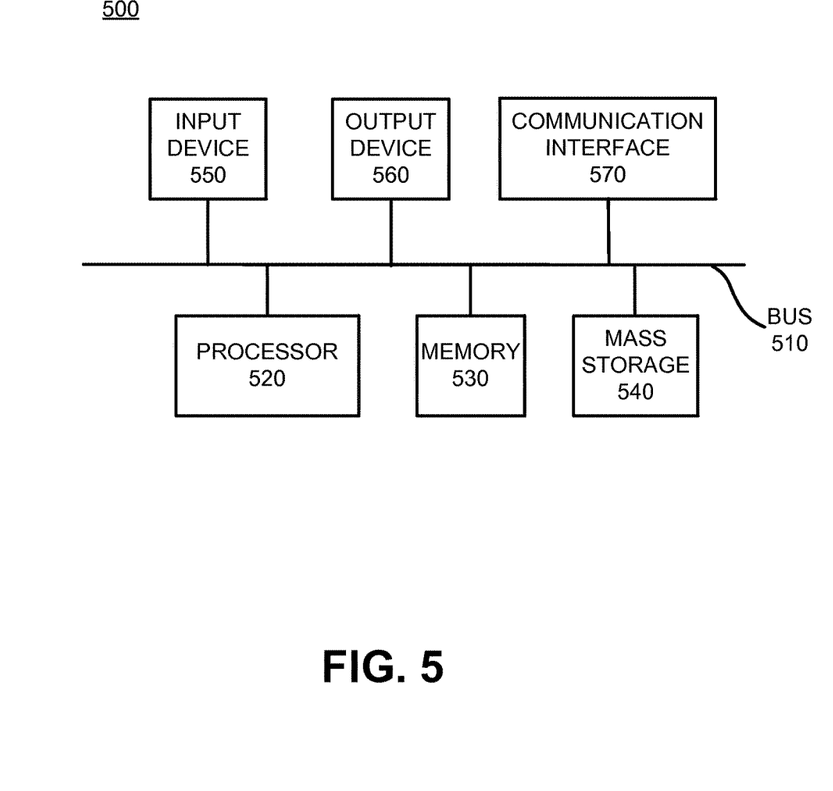
FIG. 5 is a block diagram showing exemplary components of a sponsored data service validation device and/or a content network device according to an embodiment.

FIG. 5 is a block diagram showing exemplary components of an exemplary network component 500 which may be SDS validation device 160 or a content network device 170 according to an embodiment. Network element 500 may include a bus 510, a processor 520, a memory 530, mass storage 540, an input device 550, an output device 560, and a communication interface 570.

Bus 510 includes a path that permits communication among the components of network element 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic. For example, the processor 520 may be an x86 based CPU, and may use any operating system, which may include varieties of the Windows, UNIX, and/or Linux. The processor 520 may also use high-level analysis software packages and/or custom software written in any programming and/or scripting languages for interacting with other network entities are communicatively coupled to WAN 150.

Memory 530 may include any type of dynamic storage device that may store information and/or instructions, for execution by processor 520, and/or any type of non-volatile storage device that may store information for use by processor 520. For example, memory 530 may include a RAM or another type of dynamic storage device, a ROM device or another type of static storage device, and/or a removable form of memory, such as a flash memory. Mass storage device 540 may include any type of on-board device suitable for storing large amounts of data, and may include one or more hard drives, solid state drives, and/or various types of redundant array of independent disks (RAID) arrays. For content network device 170, mass storage device 540 would be suitable for storing files associated media data. For SDS validation device 160, mass storage device 540 may store databases storing information regarding campaigns, stored mappings between SDS media addresses and remote media addresses, and information regarding sponsors and/or accounts.

Input device 550, which may be optional, can allow an operator to input information into network device 500, if required. Input device 550 may include, for example, a keyboard, a mouse, a pen, a microphone, a remote control, an audio capture device, an image and/or video capture device, a touch-screen display, and/or another type of input device. In some embodiments, network device 500 may be managed remotely and may not include input device 550. Output device 560 may output information to an operator of network device 500. Output device 560 may include a display (such as a liquid crystal display (LCD)), a printer, a speaker, and/or another type of output device. In some embodiments, network device 500 may be managed remotely and may not include output device 560.

Communication interface 570 may include a transceiver that enables network device 500 to communicate within network 115 with other devices and/or systems. The communications interface 570 may be configured to exchange data with WAN 150 over wired communications (e.g., conductive wire, twisted pair cable, coaxial cable, transmission line, fiber optic cable, and/or waveguide, etc.), or a combination of wireless. In other embodiments, communication interface 570 may interface with wide area network 150 using a wireless communications channel, such as, for example, radio frequency (RF), infrared, and/or visual optics, etc. Communication interface 570 may include a transmitter that converts baseband signals to RF signals and/or a receiver that converts RF signals to baseband signals. Communication interface 570 may be coupled to one or more antennas for transmitting and receiving RF signals. Communication interface 570 may include a logical component that includes input and/or output ports, input and/or output systems, and/or other input and output components that facilitate the transmission/reception of data to/from other devices. For example, communication interface 570 may include a network interface card (e.g., Ethernet card) for wired communications and/or a wireless network interface (e.g., a WiFi) card for wireless communications. Communication interface 570 may also include a universal serial bus (USB) port for communications over a cable, a Bluetooth® wireless interface, an RFID interface, an NFC wireless interface, and/or any other type of interface that converts data from one form to another form.

As described below, network device 500 may perform certain operations relating to verifying SDS requests when embodied as SDS validation device 160, and/or providing requested content to mobile device 105 when embodied as content network device 170. Network element 500 may perform these operations in response to processor 520 executing software instructions contained in a computer-readable medium, such as memory 530 and/or mass storage 540. The software instructions may be read into memory 530 from another computer-readable medium or from another device. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of network element 500, in other implementations, network element 500 may include fewer components, different components, additional components, or differently arranged components than depicted in FIG. 5.

FIG. 6 is a diagram depicting exemplary message flows between selected modules and devices within the network environment shown in FIG. 1. Specifically, message flows between mobile device 105, SDS validation device 160, and content network device 170 are illustrated. Additional details of message flows relating to modules 405 within mobile device 105 are also shown (e.g., messages associated with mobile application 410, SDS API 420, mobile media player 430, internal content server 440, and SDS network component 450).

Mobile application 410 may receive a command from the user to play SDS supported content, and in response, will generate a "play media" command, which is sent to SDS API 420 (M602). The play media command may include a remote media address (R_MA) and an SDS identifier (SDS_ID). Upon receiving the play media command M602, SDS API 420 may convert the remote media address to a local media address (LOC_MA) (Block 605). SDS API 420 may send the play media command along with the local media address to mobile media player 430 (M604). Upon receiving the play media command, mobile media player 430 may send a media request to internal content sever 440 to obtain the media from the content stored therein (M606). Mobile device 105 may check to see if the requested media is stored within internal content server 440 (Block 610). If the requested media is available from internal content server 440, internal content sever 440 will provide the requested media back to mobile media player 430 (M608), which will play the media, (Block 615). If the requested media is not stored in internal content server 440, internal content server 440 sends a media request to SDS network component 450 (M610). In response, SDS network component 450 may send a validation request to SDS validation device 160 (M612). The validation request may include the remote media address (R_MA) and an SDS identifier (SDS_ID). Upon receiving the validation request M612, SDS validation device 160 will check to ensure that a campaign associated with the SDS identifier is valid, and/or check to see if the user is authorized to receive SDS content. Upon proper validation, SDS validation device 160 will send on or more SDS media address(es) back to SDS network component 450 (M614).

In one embodiment and to improve efficiency, SDS network component 450 may cache SDS media addresses which have been received based on earlier validation requests (e.g., M612) that SDS network component 450 sent to SDS validation device 160. For example, in an embodiment, media may be requested based upon HTTP streaming, which may be performed using multiple requests to the same SDS media address, where the requested content is received in "chunks." Because the SDS media address is the same for each request, having the SDS validation device 160 perform a validation check for each request having the same SDS media address would be a waste of network and processing resources. Thus, once SDS network component 450 receives a valid SDS media address in message M614 associated with a particular remote media address and SDS identifier, the SDS media address is cached by SDS validation device 160, so that subsequent requests using the same remote media address and SDS identifier may use the cached SDS media address instead of sending redundant validation requests, and needlessly performing multiple validations by SDS validation device 160.

Upon determining the SDS media address, SDS network component 450 may use one or more SDS media address(es) to perform a media request to the appropriate content network device 170 (M616). In response, content network device 170 will provide media data back to SDS network component 450 (M618). SDS network component 450 may then provide the media data to be stored within internal content server 440, so that it may be retrieved by media player 430, and played (Block 615).

In an embodiment, mobile media player 430, when using HTTP to stream media in chucks, may send multiple media requests to internal content server 440, wherein message exchanges M608 through M618 may be repeated until the media content is finished or the playback is stopped by the user.

Figure 7:
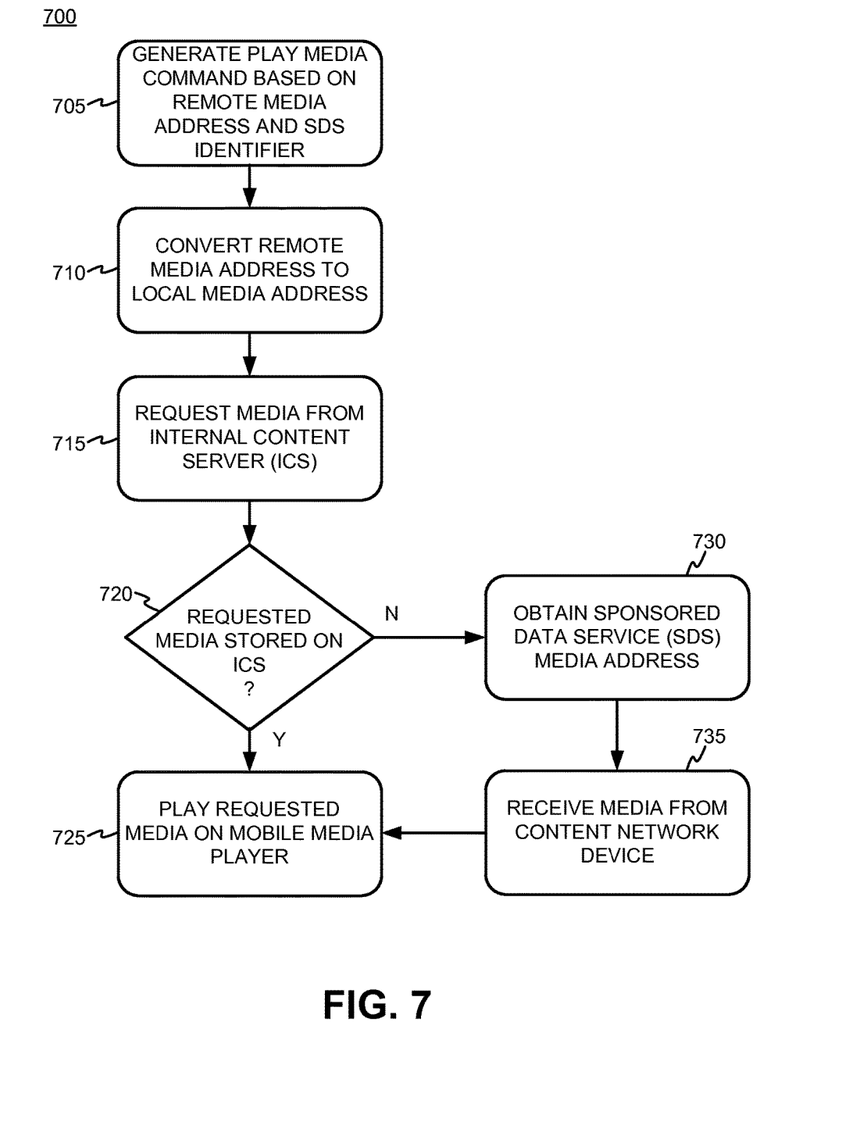
FIG. 7 is a flow chart showing an exemplary process for obtaining data access through a sponsored data service.

FIG. 7 is a flow chart showing an exemplary process 700 for obtaining data access through a sponsored data service. Process 700 may be performed at mobile device 105, for example, by processor 315 executing instructions stored in memory 320 and/or storage device 330. Mobile device 105 may initially generate a play media command that includes a remote media address and an SDS identifier (Block 705). Mobile device 105 may convert the remote media address into a local media address (Block 710). The local media address may be used by mobile media player 430 to request media from internal content server 440 (Block 715). As described above, internal content server 440 may reside within mobile device 105. Mobile device 105 may perform a check to determine whether the requested media is stored within the internal content server 440 (Block 720). If the requested media is stored within internal content server 440, mobile media player 430 will receive and play the requested media (Block 725).

If, mobile device 105 determines that the requested media is not stored within the internal content server 440 (Block 720-"N"), mobile device 105 may obtain an SDS media address from validation device 160 (Block 730). In an embodiment, the SDS media address(es) may contain special network destination information, security information (e.g., a signature, token, key, etc.), and/or additional parameters that are used by the network provider backend in, for example, the data accounting and/or billing processes.

Mobile device 105 may then request the media associated with the SDS media address from content network device 170, and subsequently receive the media from content network device 170 (Block 735). The requested media may be content which includes at least one of webpage, image, text, audio or video data. Mobile device 105 may then play the requested media on mobile media player 430 (Block 725).

In an embodiment, determining the SDS media address may include mobile device 105 sending, to SDS validation network device 160, a request for the SDS media address, where the request may be based on the remote media address and the SDS identifier. Mobile device 105 may receive, from the SDS validation device 160, the SDS media address associated with content network device 170. Mobile device 105 may further cache the SDS media address, so that subsequent media requests associated with the same SDS media address need not be validated by SDS validation device 160.

In an embodiment, the remote media address may include a hypertext transport protocol (HTTP) uniform resource locator (URL) associated with content network device 170. The SDS identifier may include sponsor account identification and a network address for third party payment associated with the requested media. In an embodiment, the SDS media address may include a HTTP URL locator associated with content network device 170, where the SDS media address includes address information for the content network device 170, a security signature, and parameters for data accounting and billing for the requested media.

In another embodiment, mobile device 105 may determine whether the SDS media address associated with the requested media was previously received, and then obtain the requested media from content network device 160 associated with the cached SDS media address.

Figure 8:
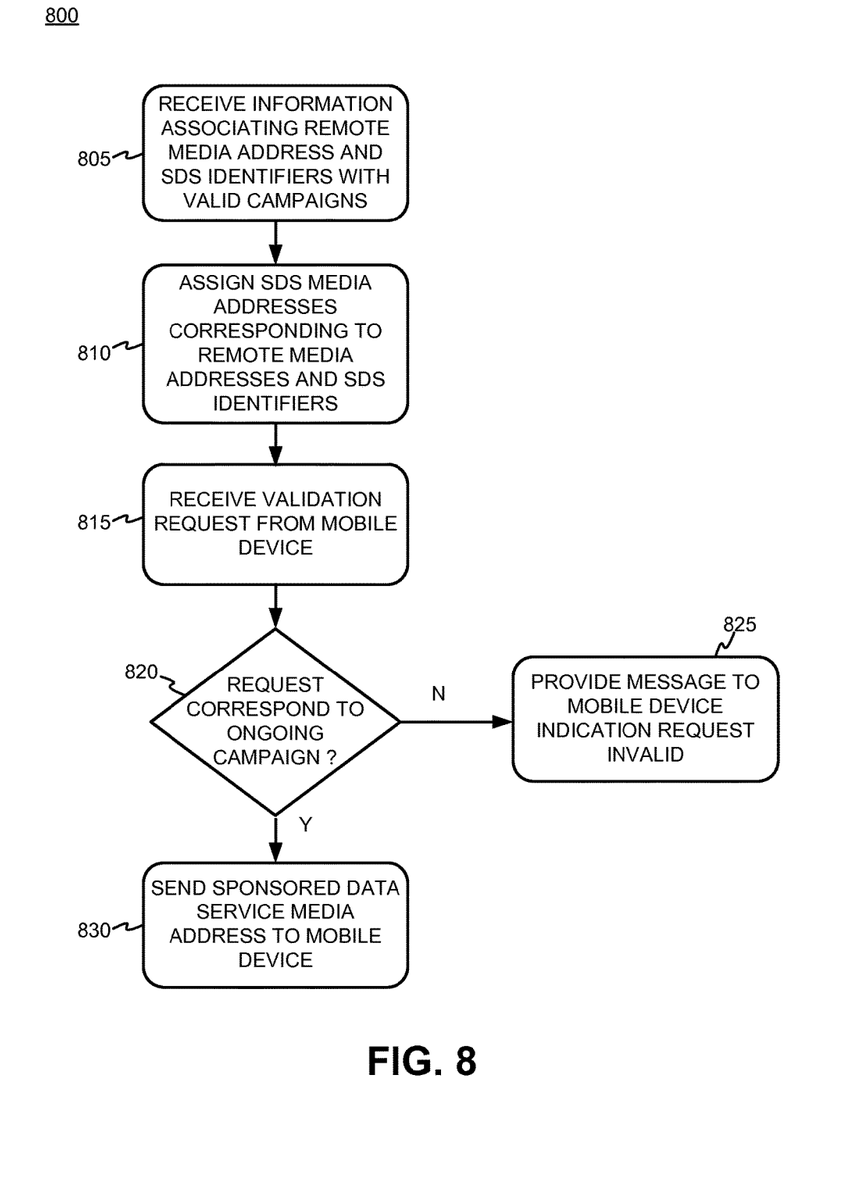
FIG. 8 is a flow chart showing an exemplary process for providing data access through a sponsored data service.

FIG. 8 is a flow chart showing an exemplary process 800 for providing data access through a sponsored data service. In an embodiment, process 800 may be performed at SDS validation device 160, by processor 520 executing instructions stored in memory 530, mass storage device 540, and/or downloaded through communication interface 570. Initially, SDS validation device 160 may receive information associating a remote media address and SDS identifier(s) with valid campaigns (Block 805). Such information may be received through a portal network device, which may be accessed by a sponsor to establish a campaign and/or modify an existing campaign. SDS validation device 160 may then assign SDS media address corresponding to remote media addresses and SDS identifiers, based on the parameters used to establish the campaign (Block 810). SDS validation device 160 may receive a validation request from mobile device 105 (Block 815). SDS validation device 160 may determine whether the received validation request corresponds to an established or active campaign (Block 820). If not, SDS validation device 160 may provide a message to mobile device 105 indicating that the request for media was invalid (Block 825). If SDS validation device 160 determines that the request corresponds to a valid campaign (Block 820-"Y"), SDS validation device 160 may send the SDS media address to mobile device 105 (Block 830).

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 6-8, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for accessing a sponsored data service (SDS) from a mobile device, comprising:
   generating, by an application executing at a mobile device within a wireless network, a play media command that includes a remote media address and an SDS identifier, wherein the SDS identifier is provided to an application programming interface (API) at the mobile device through a call generated by the application, and further wherein the SDS identifier includes sponsor account information and a network address for third party payment associated with requested media;
   converting the remote media address into a local media address;
   requesting the media from an internal content server via the local media address, wherein the internal content server resides within the mobile device;
   determining if the requested media is stored on the internal content server;

obtaining the requested media from the internal content server upon determining that the requested media is stored within the internal content server; and playing the requested media on a mobile media player.

2. The method of claim 1, wherein in response to determining that the requested media is not stored within the internal content server, the method further comprises;

determining an SDS media address associated with the requested media; and obtaining the requested media from a content network device associated with the SDS media address.

3. The method of claim 2, wherein determining the SDS media address further comprises:

sending, to a validation network device, a request for the SDS media address, wherein the request is based on the remote media address and the SDS identifier;

receiving, from the validation network device, the SDS media address associated with the content network device; and caching the SDS media address.

4. The method of claim 3, further comprising:

determining whether the SDS media address was previously received; and obtaining the requested media from the content network device associated with cached SDS media address in response to determining that the SDS media address was previously received.

5. The method of claim 2, wherein the remote media address includes a hypertext transport protocol (HTTP) uniform resource locator (URL) associated with the content network device.

6. The method of claim 2, wherein the SDS media address includes a HTTP URL associated with the content network device, wherein the SDS media address includes address information for the content network device, a security signature, and parameters for data accounting and billing for the requested media.

7. The method of claim 1; wherein the requested media comprises content which includes at least one of webpage, image, text, audio or video data.

8. A mobile device, comprising:

an interface configured to communicate with a network;

a memory configured to store instructions; and a processor, coupled to the interface and the memory, wherein the stored instructions, when executed by the processor, cause the processor to:

generate, by an application executed on the processor, a play media command that includes a remote media address and an SDS identifier, wherein the SDS identifier is provided to an application programming interface (API) at the mobile device through a call generated by the application, and further wherein the SDS identifier includes sponsor account information and a network address for third party payment associated with requested media, convert the remote media address into a local media address, request the media from an internal content server via the local media address, wherein the internal content server resides within the mobile device, determine if the requested media is stored on the internal content server, obtain the requested media from the internal content server upon determining that the requested media is stored within the internal content server, and play the requested media on a mobile media player.

9. The mobile device of claim 8, wherein in response to determining that the requested media is not stored within the internal content server, the instructions further cause the processor to:

determine an SDS media address associated with the requested media, and obtain the requested media from a content network device associated with the SDS media address.

10. The mobile device of claim 9, wherein the instructions to determine the SDS media address further cause the processor to:

send, to a validation network device, a request for the SDS media address, wherein the request is based on the remote media address and the SDS identifier, receive, from the validation network device, the SDS media address associated with the content network device, and cache the SDS media address.

11. The mobile device of claim 10, wherein the instructions further cause the processor to:

determine whether the SDS media address was previously received, and obtain the requested media from the content network device associated with the cached SDS media address in response to determining that the SDS media address was previously received.

12. The mobile device of claim 9, wherein the remote media address includes a hypertext transport protocol (HTTP) uniform resource locator (URL) associated with the content network device.

13. The mobile device of claim 9, wherein the SDS media address includes a HTTP URL associated with the content network device, wherein the SDS media address includes address information for the content network device, a security signature, and para ers for data accounting and billing for the requested media.

14. The mobile device of claim 8, wherein the requested media comprises content which includes at least one of webpage, image, text, audio or video data.

15. A non-transitory computer-readable medium comprising instructions, which, when executed by a processor, cause the processor to:

generate, by an application executing at a mobile device within a wireless network, a play media command that includes a remote media address and an SDS identifier, wherein the SDS identifier is provided to an application programming interface (API) at the mobile device through a call generated by the application, and further wherein the SDS identifier includes sponsor account information and a network address for third party paymentassociated with requested media, convert the remote media address into a local media address, request the media from an internal content server via the local media address, wherein the internal content server resides within a mobile device, determine if the requested media is stored on the internal content server, obtain the requested media from the internal content server upon determining that the requested media is stored within the internal content server, and play the requested media on a mobile media player.

16. The non-transitory computer-readable medium of claim 15, wherein in response to determining that the requested media is not stored within the internal content server, the instructions further cause the processor to:

determine an SDS media address associated with the requested media, and obtain the requested media from a content network device associated with the SDS media address.

17. The non-transitory computer-readable medium of claim 16, wherein the instructions to determine the SDS media address further cause the processor to:

send, to a validation network device, a request for the SDS media address, wherein the request is based on the remote media address and the SDS identifier, receive, from the validation network device, the SDS media address associated with the content network device, and cache the SDS media address.

18. The non-transitory computer-readable medium of claim 7, wherein the instructions cause the processor to:

determine whether the SDS media address was previously received, and obtain the requested media from the content network device associated with the cached SDS media address in response to determining that the SDS media address was previously received.

19. The non-transitory computer-readable medium of claim 16, wherein the remote media address includes a hypertext transport protocol (HTTP) uniform resource locator (URL) associated with the content network device.

20. The non-transitory computer-readable medium of claim 16, wherein the SDS media address includes a HTTP URL associated with the content network device, wherein the SDS media address includes address information for the content network device, a security signature, and parameters for data accounting and billing for the requested media.

* * * * *